Nov. 23, 1948.  L. PARASKEVAS  2,454,611
RETRACTABLE AUXILIARY LANDING GEAR FOR AIRCRAFT
Filed Jan. 26, 1944  3 Sheets-Sheet 1
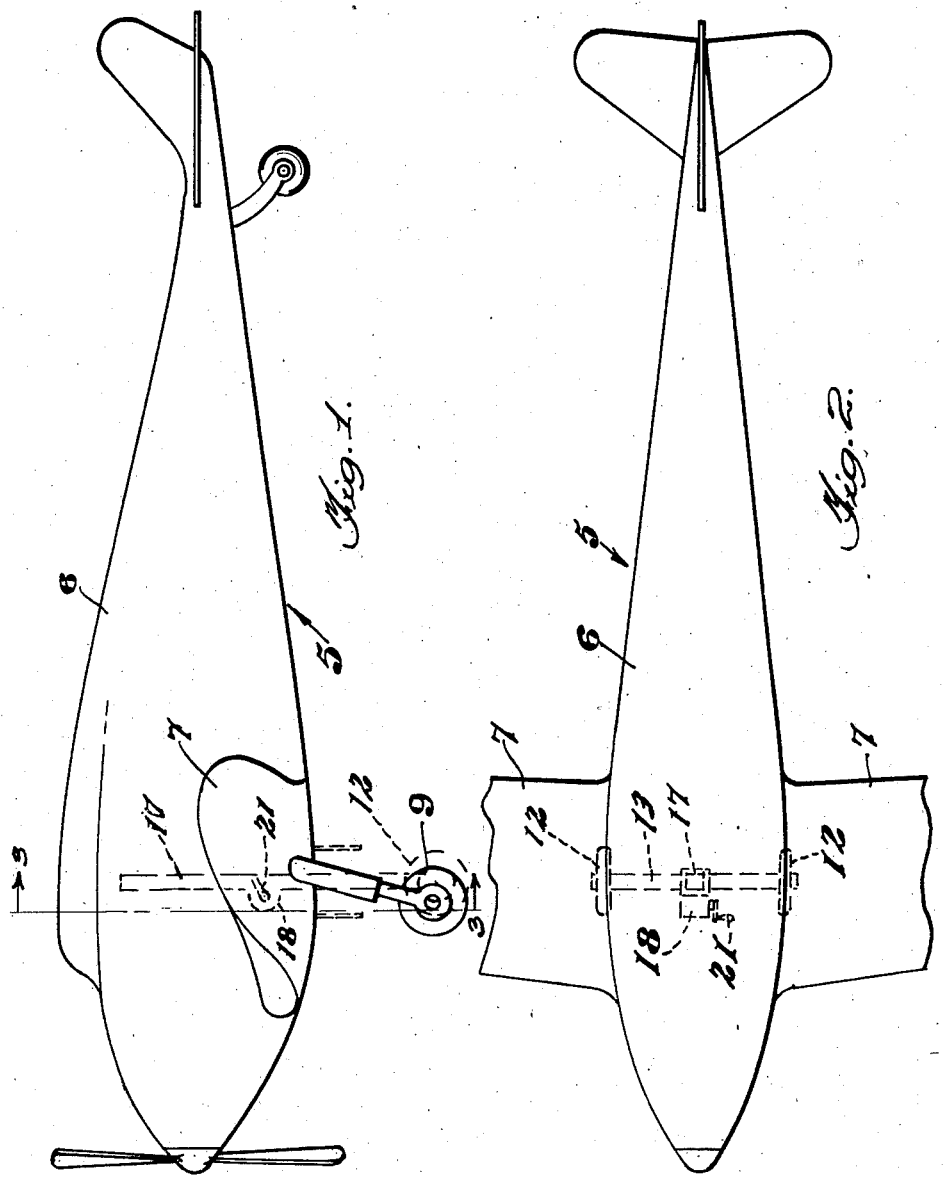
Inventor
LOUIS PARASKEVAS
By Clarence A. O'Brien
and Harvey B. Jacobson
Attorneys

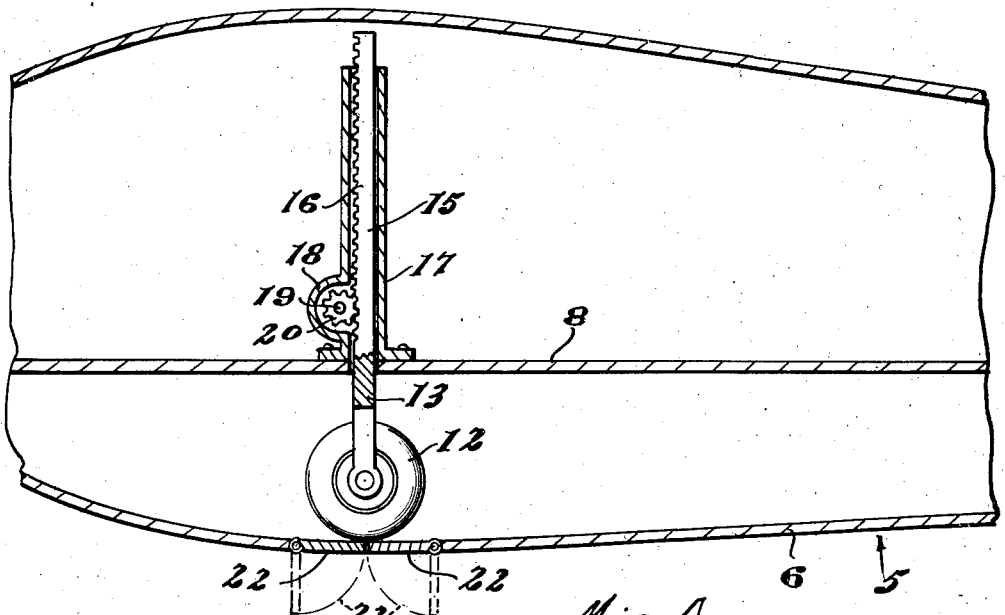

Patented Nov. 23, 1948

2,454,611

UNITED STATES PATENT OFFICE 2,454,611

RETRACTABLE AUXILIARY LANDING GEAR FOR AIRCRAFT

Louis Paraskevas, New Orleans, La.

Application January 26, 1944, Serial No. 519,806

3 Claims. (Cl. 244—102)

This invention relates to new and useful improvements in the art of aeronautics and more particularly to improved landing gear for aircraft.

The principal object of the present invention is to provide an auxiliary landing gear for aircraft to the end that in the event that something defective occurs in the standard landing gear, the auxiliary landing gear can be brought into use.

Other objects and advantages of the invention will become apparent to the reader of the following description.

In the drawings:

Figure 1 represents a side elevational view showing in dotted lines the auxiliary landing gear.

Figure 2 is a fragmentary top plan view of an aeroplane showing in broken lines the auxiliary landing gear.

Figure 4 is a fragmentary longitudinal sectional view through the fuselage of an aeroplane showing the auxiliary landing gear.

Figure 5 is a fragmentary enlarged side elevational view of the operating means of the auxiliary landing gear.

Figure 6 is a section taken on the line 6—6 of Figure 5.

Figure 3:
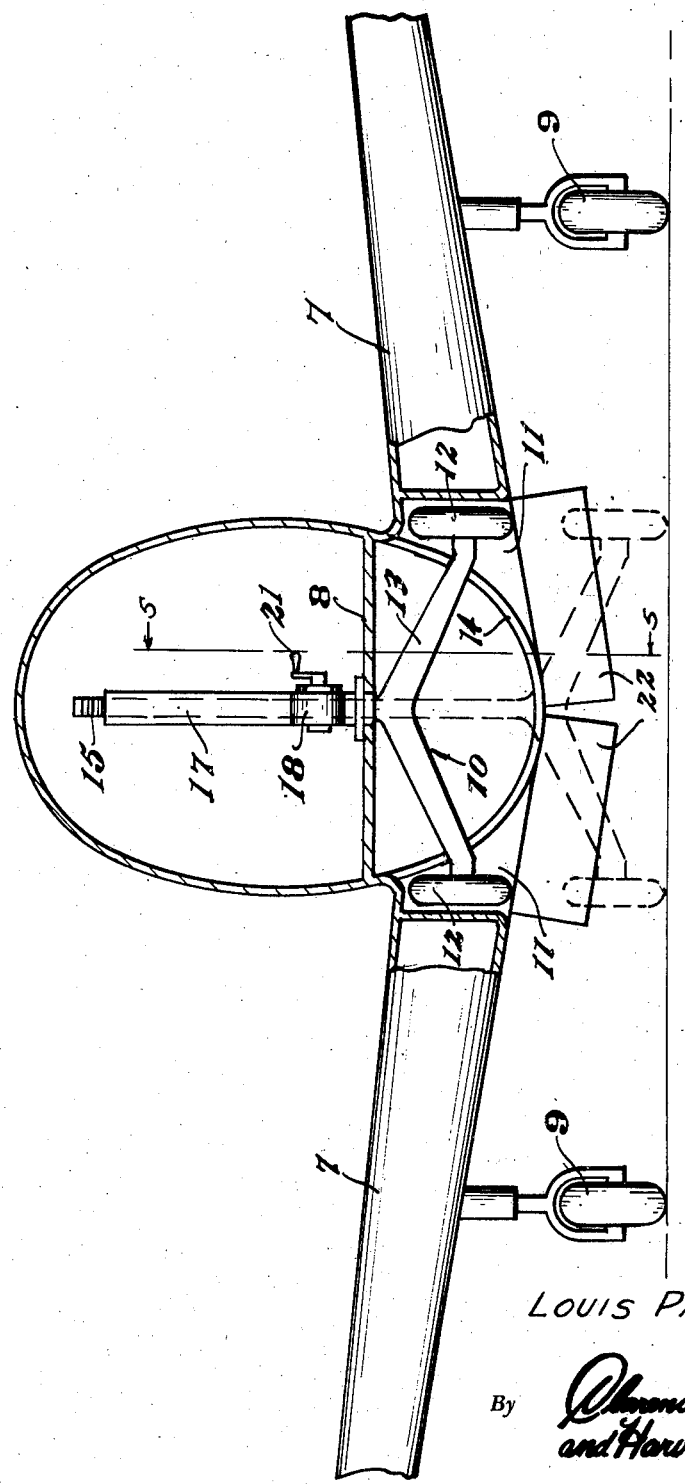
Figure 3 is a fragmentary front elevational view showing the standard landing gear and the auxiliary landing gear in retracted position.

Referring to the drawings wherein like numerals designate like parts, it can be seen that numeral 5 generally refers to an aeroplane having a fuselage 6. This aeroplane is of the monoplane type having wings 7, 7 and preferably a floor 8 extending longitudinally in the fuselage.

Numerals 9, 9 represent wheels of the standard landing gear which may be of the retractible type, while numeral 10 generally refers to the auxiliary landing gear which forms the present invention.

In carrying out the present invention, it is preferable that the inner ends of the wings 7, 7 be constructed to form wheel receiving pockets 11 for the reception of the wheels 12 of the auxiliary landing gear. These wheels 12 are carried by stub axles at the ends of a substantially inverted V-shaped frame 13 which is vertically movable in a transverse slot 14 in the bottom of the fuselage.

A post 15 rises from the frame 13 and has rack teeth 16 along one side thereof. The post 15 extends upwardly through an opening in the floor 8 and vertically through a hollow guide 17. A small housing 18 at the lower portion of the guide 17 has a shaft 19 extending into the same and this shaft carries a gear 20 which meshes with the rack teeth 16. One end of the shaft 19 is provided with a crank handle 21.

A pair of spring closed trap doors 22, 22 are provided in the bottom of the fuselage 6, so that when the post 15 is forced downwardly by actuation of the crank handle 21, the wheels 12 will force against the doors 22, opening the same as the auxiliary landing gear descends to landing position.

A pawl 23 is provided on the outside of the housing 18 and this engages a gear or ratchet wheel 24 on the shaft 19 at the outside of the housing 18 so as to hold the post with the auxiliary landing gear in descended position. This auxiliary landing gear is especially useful in the event the customary standard landing gear becomes defective, especially damaged during wartime tactics.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In combination, an aircraft including a fuselage with wings having pockets and a service landing gear; an auxiliary landing gear operative independent of the service landing gear comprising a frame operative through the bottom of the fuselage, wheels attached to said frame receivable into the pockets, a rack attached to said frame, a guide mounted in said fuselage with said rack slidably mounted therein, a housing attached to said guide and a manually operative pinion journaled therein engaging said rack, and means secured to said housing for preventing rotation of said pinion in a preselected direction.

2. In combination, an aircraft including a fuselage with wings having pockets and a service landing gear, an auxiliary landing gear operative independent of the service landing gear comprising a frame operative through the bottom of the fuselage, wheels attached to said frame receivable into the pockets, a rack attached to said frame, a guide mounted in said fuselage with said rack slidably mounted therein, a housing attached to said guide and a manually operative pinion journaled therein engaging said rack, and means secured to said housing for preventing rotation of said pinion in a preselected direction, said last-mentioned means including a gear secured to said pinion and a dog pivotally mounted on said housing engaging the teeth of said gear.

3. In combination, an aircraft including a fuselage with wings having pockets and a service landing gear; an auxiliary landing gear operative independent of the service landing gear comprising a frame operative through the bottom of the fuselage, wheels attached to said frame receivable into the pockets, a rack attached to said frame, a guide mounted in said fuselage with said rack slidably mounted therein, a housing attached to said guide and a manually operative pinion journaled therein engaging said rack, and means secured to said housing for preventing rotation of said pinion in a preselected direction, said last-mentioned means including a shaft rigidly secured to said pinion and extending exterior of said housing, a gear secured to said shaft, a dog pivotally mounted on the exterior of said housing engaging the teeth of said gear.

LOUIS PARASKEVAS.

REFERENCES CITED

The following references are of record in the file of this patent:

UNITED STATES PATENTS

| Number | Name | Date |
|---|---|---|
| 1,482,520 | Lyon | Feb. 5, 1924 |
| 1,523,675 | Towle | Jan. 20, 1925 |
| 1,812,698 | Hickox et al. | June 30, 1931 |
| 1,882,416 | Gastwirth | Oct. 11, 1932 |
| 2,044,108 | Sinquefield | June 16, 1936 |

FOREIGN PATENTS

| Number | Country | Date |
|---|---|---|
| 12,260 | France | May 26, 1910 |